United States Patent
Lee

(10) Patent No.: US 6,874,399 B2
(45) Date of Patent: Apr. 5, 2005

(54) CUTTING MACHINE WITH BUILT-IN MITER CUTTING FEATURE

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 0 days.

(21) Appl. No.: 10/246,207

(22) Filed: Sep. 18, 2002

(65) Prior Publication Data

US 2004/0050232 A1 Mar. 18, 2004

(51) Int. Cl.⁷ .............................. B26D 5/00; B27B 5/25; B28D 1/04
(52) U.S. Cl. .............................. 83/581; 83/168; 83/169; 83/171; 83/435.11; 83/473; 83/477.1; 83/477.2; 83/699.51; 125/13.03
(58) Field of Search .......................... 83/581, 574, 168, 83/169, 171, 473, 177, 490, 477.2, 435.4, 698.11, 698.51, 699.51, 435.15, 477.1; 125/13.03, 35, 16.04, 16.03, 13.01; 451/450, 488, 360, 454, 455, 11, 342

(56) References Cited

U.S. PATENT DOCUMENTS

| | | | | |
|---|---|---|---|---|
| 3,807,095 A | * | 4/1974 | Harding et al. | 125/13.03 |
| 4,428,159 A | * | 1/1984 | Sigetich et al. | 451/213 |
| 4,991,354 A | * | 2/1991 | Schweickhardt | 451/188 |
| 5,216,964 A | * | 6/1993 | Sato et al. | 83/471.3 |
| 5,676,124 A | * | 10/1997 | Lee | 125/13.01 |
| 5,746,193 A | * | 5/1998 | Swan | 125/13.03 |
| 6,272,961 B1 | * | 8/2001 | Lee | 83/581 |
| 6,276,990 B1 | * | 8/2001 | Greenland | 451/11 |
| 6,508,244 B2 | * | 1/2003 | Lee | 125/12 |

* cited by examiner

Primary Examiner—Boyer D. Ashley
(74) Attorney, Agent, or Firm—Raymond Y. Chan; David and Raymond Patent Group

(57) ABSTRACT

A miter cutting arrangement for a cutting machine is provided to accommodate cutting work at an angle or a bevel for precisely cutting on a work piece. It includes a platform support arm longitudinally mounting to a cutting head support bracket, a platform pivot arm transversely extended from the platform support arm, a head platform pivotally connected with the platform pivot arm to support a motor, a miter supporting unit, and a locker device for selectively locking the cutting head at the normal position and the slanted position. The miter supporting unit includes a miter support provided at an outer side of the head platform and a miter stopper provided at an outer end of the platform pivot arm to block the miter support when the head platform is rotated at the slanted position.

18 Claims, 8 Drawing Sheets

CUTTING MACHINE WITH BUILT-IN MITER CUTTING FEATURE

BACKGROUND OF THE PRESENT INVENTION

1. Field of Invention

The present invention relates to a cutting machine, and more particularly to a cutting machine with a built-in miter cutting feature which is adjusted accommodate cutting work at an angle or a bevel for precisely cutting on a work piece such as ceramic tile, marble, and the like.

2. Description of Related Arts

A conventional cutting machine is commonly used in the construction industry for shaping and cutting material such as ceramic tile, marble, and natural stone. The conventional cutting machine comprises a cutting table supported on a table frame, and a cutting head overhanging the cutting table with a circular saw blade which is powered by an electric motor. The electric motor is directly mounted on the cutting head for driving the saw blade to rotate through a transmission means.

Conventionally, the saw blade is rigidly installed perpendicularly to the cutting table so that when a work piece is placed horizontally to the cutting table for cutting or shaping, the work piece will be cut and has a right-angled cutting edge. If a user wants to have a bevel cut on the work piece, the user must inclinedly support the work piece to adjust a slanted angle with respect to the saw blade by himself.

Some improved cutting machines provide a 30° to 45° miter block to inclinedly support the work piece so that the vertical saw blade can be positioned to the work piece at a slanted angle in order to provide a bevel cut on the work piece. However, the angle of the work piece to be lifted up is limited by the size of the miter block. Sometime, when the miter block fails to correctly place in position, an uneven bevel cut may happen or a permanent damage may be caused to the work piece. In general the work piece to be cut needs to be placed up side down for proper angle cutting, that may cause chipping at the work piece's cutting edge.

Alternatively, the cutting head can be rotated with respect to the cutting table such that the saw blade can inclinedly cut on the work piece. However, due to the mechanical connection of the cutting head such as screwing and welding, the cutting head may not be set and locked at exactly 45° degrees with respect to the cutting table. In other words, the bevel cut on the work piece will be deflected by the saw blade. Moreover, the movable parts of the cutting head will be worn out after a period of time so that the alignment of the inclination of the cutting head will be off so as to affect the bevel cutting performance of the saw blade. However, the conventional cutting machine fails to provide a fine adjustment to tune the inclination of the cutting head which is 45° degrees with respect to the cutting table.

SUMMARY OF THE PRESENT INVENTION

A main object of the present invention is to provide a cutting machine with built-in miter cutting feature that accommodates cutting work in at an angle or a bevel for precisely cutting on a work piece.

Another object of the present invention is to provide a cutting machine with built-in miter cutting feature, wherein the cutting head of the cutting machine can be rigidly supported at a 45° degrees with respect to the cutting table for providing a bevel cut on the work piece.

Another object of the present invention is to provide a cutting machine with built-in miter cutting feature, wherein the cutting head can be finely tuned to obtain a precise 45° degrees with respect to the cutting table.

Another object of the present invention is to provide a cutting machine with built-in miter cutting feature, wherein a projectile angle of the cutting head with respect to the cutting table can be finely adjusted so as to provide a precise cut on the work piece.

Another object of the present invention is to provide a cutting machine with built-in miter cutting feature, wherein the cutting head is locked at either a normal vertical position or an inclined position, so as to prevent an unwanted lateral movement of the cutting blade during cutting process.

Accordingly, in order to accomplish the above objects, the present invention provides a cutting machine, comprising:

a table frame;

a cutting table slidably mounted on the table frame;

a cutting head comprising a motor and a cutting blade rotatably driven by the motor;

a cutting head support bracket affixed at one side of the table frame for supporting the cutting head above the cutting table; and a miter cutting arrangement, which is provided between the cutting head support bracket and the cutting head, comprising:

a platform support frame which comprises a platform support arm, means for longitudinally mounting the platform support arm to the cutting head support bracket so as to support the platform support arm longitudinally extending above the table frame, and a platform pivot arm having an inner end affixed to the platform support arm and an outer end extended from the platform support arm;

a head platform wherein the motor is firmly mounted thereon and the cutting blade is rotatably supported at an outer side thereof;

a pivot mean for pivotally connecting the outer side of the head platform with the platform pivot arm in a perpendicular manner that the cutting head is able to be rotated about the head platform to a slanted position by lifting an inner side of the head platform up from the platform support frame;

a miter supporting unit which comprises a miter support provided at the outer side of the head platform and a miter stopper provided at the outer end of the platform pivot arm to bias against the miter support when the head platform is rotated about the pivot means, so as to substantially support the head platform in the slanted position;

a supporting means for supporting the inner side of the head platform with the platform support arm, so that, during the normal position, the outer side and the inner side of the head platform are respectively supported by the platform pivot arm and the platform support arm; and a locker means for selectively locking the cutting head at the normal position and the slanted position.

DETAILED DESCRIPTION OF THE PREFERRED EMBODIMENT

Figure 1:
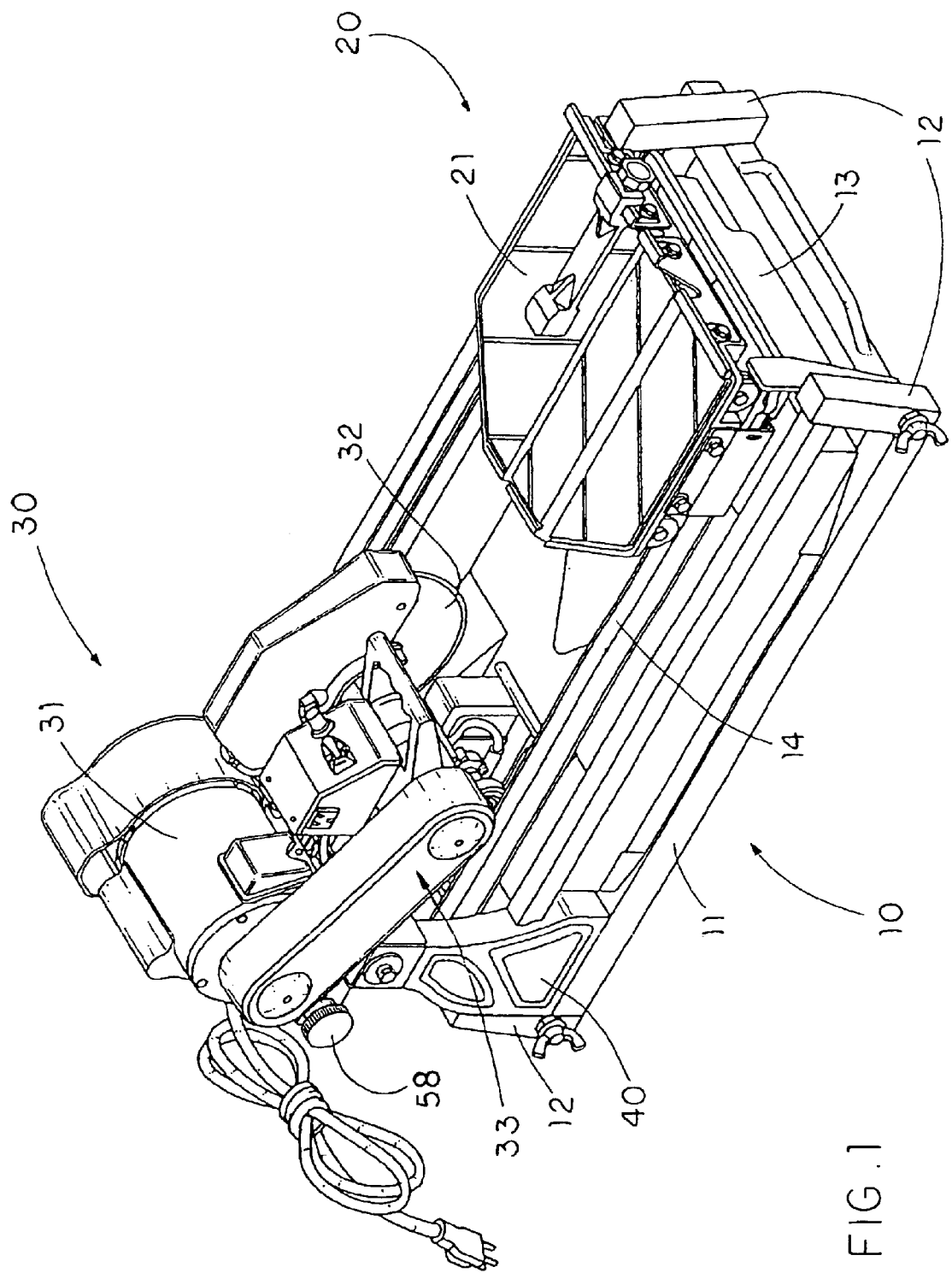
FIG. 1 is a perspective view of a cutting machine with built-in miter cutting arrangement according to a preferred embodiment of the present invention.

Referring to FIGS. 1 through 4 of the drawings, a cutting machine with built-in miter cutting feature, which is specifically designed for ceramic and masonry work pieces such as tiles, according to a preferred embodiment of the present invention is illustrated. The cutting machine comprises a table frame 10, a cutting table 20 slidably mounted on the table frame 10, a cutting head 30, and a cutting head support bracket 40 affixed at one side of the table frame 10 for supporting the cutting head 30 above the cutting table 20.

The cutting head 30 comprises a motor 31, a cutting blade 32, and a transmission means 33 for transmitting a rotating power of the motor 31 to drive the cutting blade 32 to rotate.

The cutting machine further comprises a miter cutting arrangement 50, which is provided between the cutting head support bracket 40 and the cutting head 30, comprises a platform support frame 51 which comprises a platform support arm 511, means 512 for longitudinally mounting the platform support arm 511 to the cutting head support bracket 40 so as to support the platform support arm 511 longitudinally extending above the table frame 10, and a platform pivot arm 513 having an inner end 513A affixed to the platform support arm 511 and an outer end 513B extended from the platform support arm 511.

The miter cutting arrangement 50 further comprises a head platform 52 wherein the motor 31 is firmly mounted thereon and the cutting blade 32 is rotatably supported at an outer side thereof, and a pivot means 53 for pivotally connecting the outer side of the head platform 52 with the platform pivot arm 513 in a perpendicular manner that the cutting head 30 is able to be rotated about the head platform 52 to a slanted position by lifting an inner side of the head platform 52 up from the platform support frame 511.

The miter cutting arrangement 50 further comprises a miter supporting unit 54 for supporting the head platform 52 at the slanted position, a supporting means 55 for supporting the head platform 52 at the normal position, and the locker means 56 for selectively locking the cutting head 30 at the normal position and the slanted position.

The miter supporting unit 54 comprises a miter support 541 provided at the outer side of the head platform 52 and a miter stopper 542 provided at the outer end 513B of the platform pivot arm 513 to bias against the miter support 541 when the head platform 52 is rotated about the pivot means 53 so as to substantially support the head platform 52 in the slanted position.

The supporting means 55 is adapted for supporting the inner side of the head platform 52 with the platform support arm 511, so that during the normal position, the outer side and the inner side of the head platform 52 are respectively supported by the platform pivot arm 513 and the platform support arm 511.

Figure 2:
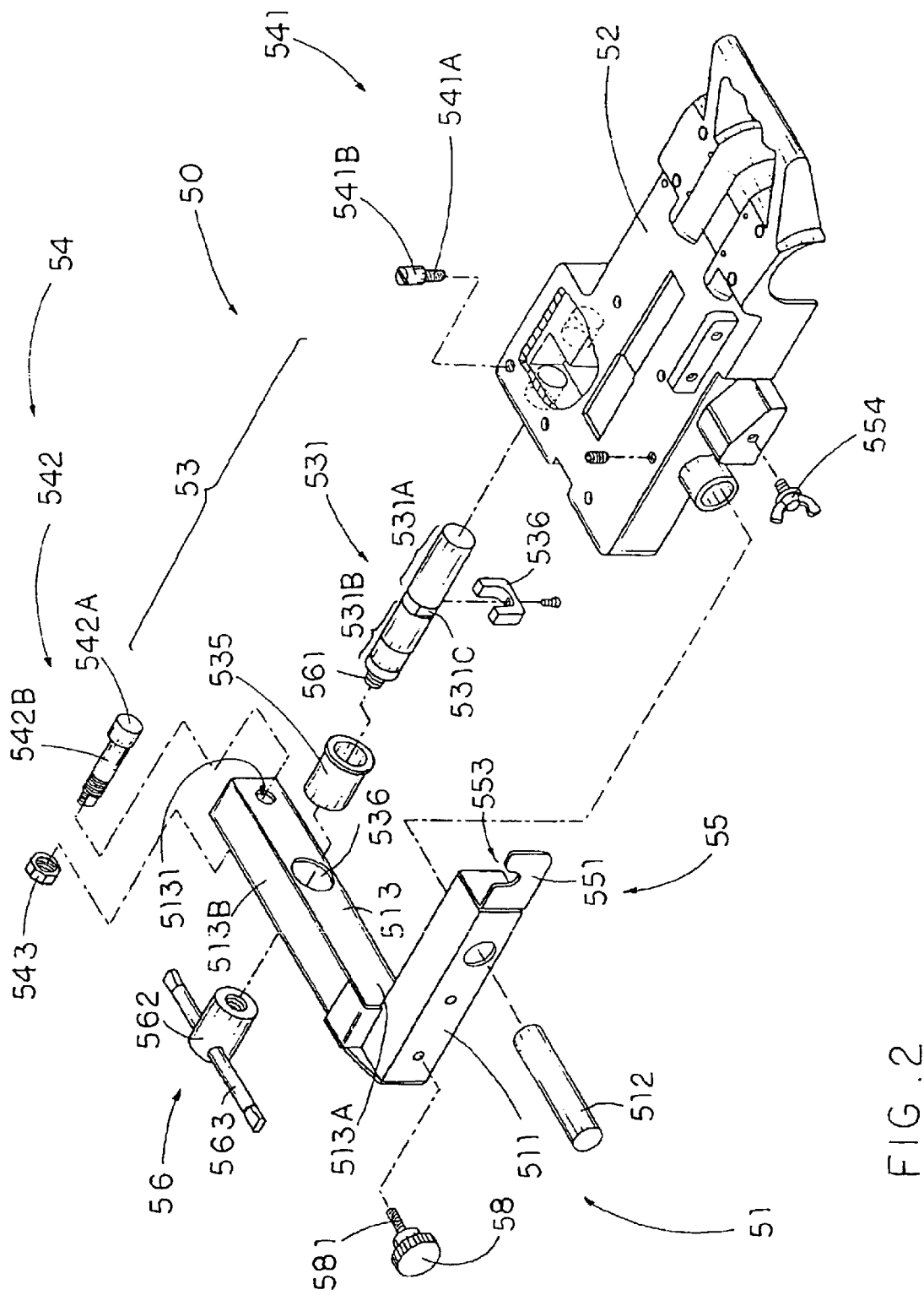
FIG. 2 is an exploded perspective view of the miter cutting arrangement of the cutting machine according to the above preferred embodiment of the present invention.

As shown in FIG. 2, the table frame 10 further comprises a bottom frame 11 wherein four construction posts 12 are upwardly extended from four corners of the bottom frame 11 respectively wherein a coolant tray 13 is supported on the bottom frame and disposed beneath the cutting table 20 such that the coolant tray 13 is adapted for pulling out from the table frame 10 sidewardly to clean and replace the liquid coolant. A pair of sliding rails 14 is extended parallely and connected between the two pairs of construction posts 12 respectively. The cutting head support bracket 40 is upwardly extended from a side of the bottom frame 11 for supporting the cutting head 30.

The cutting table 20 which is slidably mounted on the table frame 10 comprises a work table 21 sitting across the two parallel sliding rails 14 so as to enable the work table 21 of the cutting table 20 sliding longitudinally along the two sliding rails 14.

According to the preferred embodiment, the mounting means 512 is a pivot joint to pivotally connect a front end of the platform support arm 511 with the cutting head support bracket 40 in such a manner that a rear end of the platform support arm 511 is capable of pivotally moving perpendicularly with respect to the cutting table 20 so as to adjust a projectile angle of the cutting head 30.

The inner end 513A of the platform pivot arm 513 is rigidly extended from the rear end of the platform support arm 511 to form a L-shaped member.

The pivot means 53 comprises an pivot shaft 531 having a front shaft portion 531A, a rear shaft portion 531B, and a square-shaped shaft neck 531C formed between the front and rear shaft portions 531A, 531B. The shaft neck 531C and the front shaft portion 531A are rotatably positioned in a shaft cavity 532 provided at a rear end of the outer side of the head platform 51 and at least a front end of the front shaft portion 531A is inserted into a shaft hole 533 formed at a front end wall of the shaft cavity 532. The rear shaft portion 513B of the pivot shaft 531 is arranged to rearwardly extend and penetrate through a through hole 534 provided at a rear end wall of the shaft cavity 532 and a shaft sleeve 535 which is mounted on an arm hole 536 formed at the outer end 513B of the platform pivot arm 513. The pivot means 53 further comprises a U-shaped stopper 536 positioned in the shaft cavity 532 and upwardly screwed around the shaft neck 531C for locking the pivot shaft 531 in position, so as to limit the pivot shaft 531 from being pulled out from the shaft cavity 532 by blocking against the rear end wall of the shaft cavity 532.

Accordingly, the pivot shaft 531 has a diameter slightly smaller than a diameter of the shaft hole 533 so that the head platform 52 can be freely rotated about the pivot shaft 531. In other words, by means of the pivot shaft 531, the head platform 52 can be pivotally connected with the platform pivot arm 513, so that the inner side of the head platform 52 can be upwardly rotated about the pivot shaft 531, i.e. the outer side of the head platform 52.

The miter support 541 of the miter supporting unit 54 has a tail portion 541A substantially affixed to the outer side of the head platform 52 and a head portion 541B upwardly protruded from the head platform 52.

Figure 4:
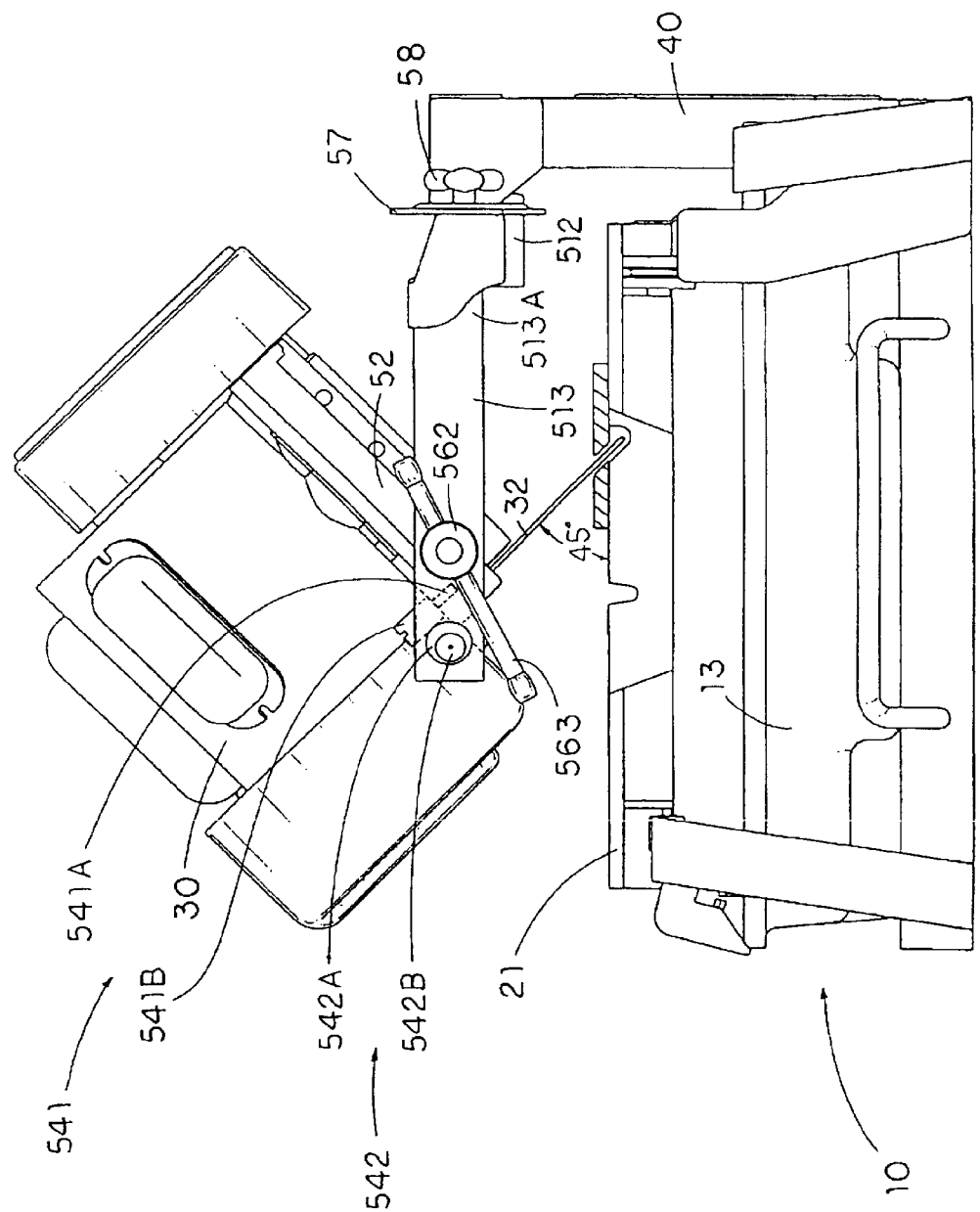
FIG. 4 is a rear view of the cutting machine with built-in miter cutting arrangement according to the above preferred embodiment of the present invention, wherein the cutting head is at the slanted position to provide a bevel cut.

The miter stopper 542 has an elongated stopper body 542B rotatably affixed to the platform pivot arm 513 through a through hole 5131 and an enlarged stopper head 542A which is extended from the stopper body 542B and frontwardly protruded from the outer end 513B of the platform pivot arm 513, in such a manner that when the inner side of the head platform 52 is lifted up to inclinedly rotate the cutting head 30, the head portion 541B of the miter support 541 is driven to bias against the stopper head 542A of the miter stopper 542 so as to block the rotational movement of the head platform 52 and substantially support the cutting head 30 at the slanted position, as shown in FIG. 4.

Figure 5C:
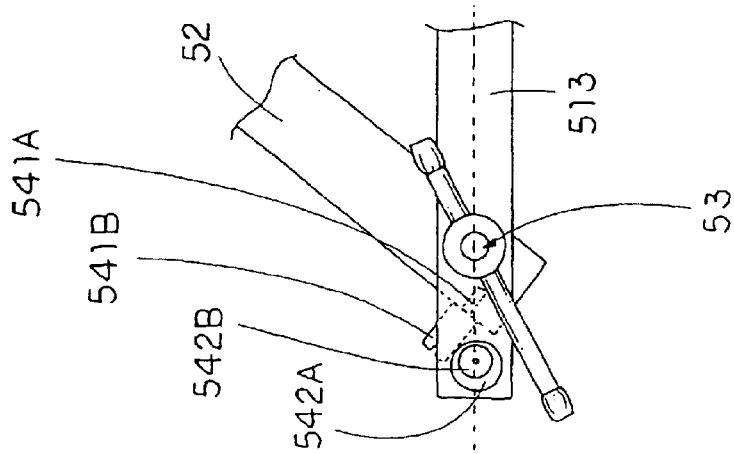
FIGS. 5A to 5C illustrate the miter cutting arrangement for fine adjusting the inclination angle of the cutting head of the cutting machine according to the above preferred embodiment of the present invention.
Figure 5B:
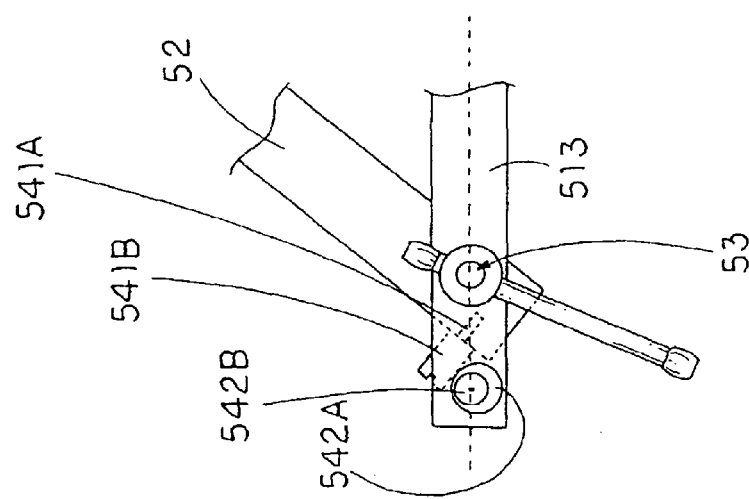
Figure 5A:
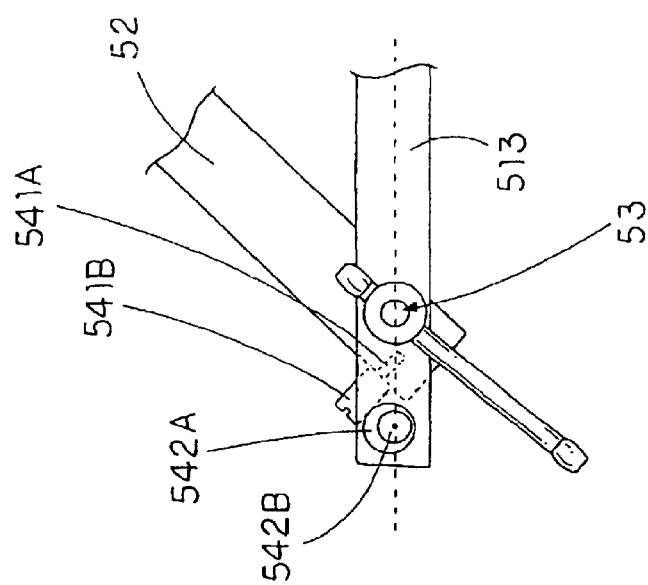

In addition, the stopper body 542B of the miter stopper 542 is non-coaxially extended from the stopper head 542A thereof in such a manner that by rotating the stopper body 542B, the head portion 541B of the miter support 541 is adjustably blocked on a circumferential surface of the stopper head 542A of the miter stopper 542, so as to fine adjust the inclination angle of the head platform 52 with respect to the cutting table 20, as shown in FIGS. 5A to 5C.

Preferably, the inclination angle of the head platform 52 is 45° with respect to the cutting table 20 when the head portion 541B of the miter support 541 is blocked by the stopper head 542A of the miter stopper 542. However, due to the deflection of the cutting machine, the inclination angle of the head platform 52 may be 46°. Therefore, the user is able to turn the miter support 541 until the head portion 541B of the miter support 541 is blocked by the stopper head 542A of the miter stopper 542 at a position that the head platform 52 is 45° inclined with respect to the cutting table 20. In other words, the miter cutting arrangement 50 of the present invention is capable of ensuring the inclination angle of the head platform 52 so as to precisely provide a bevel cut on the work piece.

Moreover, the miter supporting unit 54 further comprises a locking element 543 for securely locking up the stopper body 542B of the miter stopper 542 at a rear end thereof to the outer end 513B of the platform pivot arm 513 in such a manner that once the inclination angle of the head platform 52 is finely adjusted, the miter stopper 542 is securely locked up via the locking element 543, so that the head platform 52 is inclinedly supported at the precise inclination angle every time when the head portion 541B of the miter support 541 is biased against the stopper head 542A of the miter stopper 542. In other words, the locking element 543 is adapted to lock up the stopper body 542B to the outer end 513B of the platform pivot arm 513 after a fine adjustment of the inclination angle of the head platform 52 is set.

Figure 3:
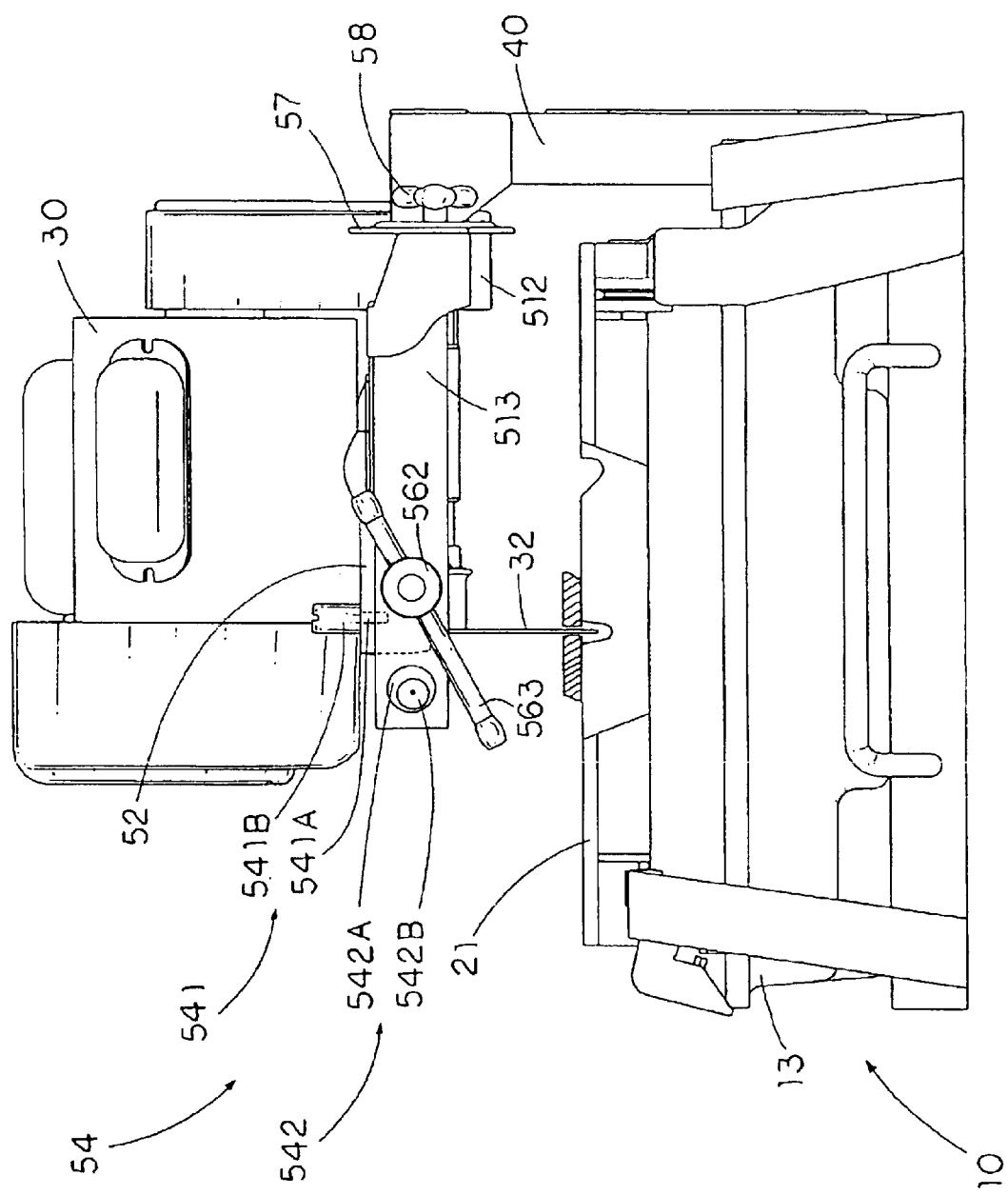
FIG. 3 is a rear view of the cutting machine with built-in miter cutting arrangement according to the above preferred embodiment of the present invention, wherein the cutting head is at the normally position.

The supporting means 55 comprises a support wing 551 longitudinally extended from a front end of the platform support arm 511 and a locking member 552 laterally protruded from the inner side of the head platform 52 for coupling with the supporting wing 551. When the head platform 52 is in its normal position, that is when the head platform 52 is positioned horizontally and the cutting blade 32 is positioned vertically as shown in FIG. 3, the locking member 552 is arranged to sit on the support wing 551 so that the inner side of the head platform 52 is supported by the platform support arm 511.

As shown in FIG. 2, a U-shaped engagement slot 553 is formed on the support wing 551 and the locking member 552 comprises a hand bolt 554 screwed to the inner side of the head platform 52, wherein the hand bolt 554 is adapted to engage with the engagement slot 553, so that by tightening the hand bolt 554 against the support wing 551, the head platform 52 is locked up at the normal position.

The locker means 56 comprises a threaded shank 561 integrally and coaxially connected to a rear end of the rear shaft portion 531B of the pivot shaft 531 and rearwardly extended out of the platform pivot arm 513, and a locking head 562 which is screwed on the threaded shank 561. By rotating a handle bar 563, which is radically attached to the locking head 562, to rotate the locking head 562 clockwise or counter-clockwise can selectively reduce or increase a distance between a front end surface of the locking head 562 and the stopper 536, so as to forcedly press the head platform 52 against the platform pivot arm 513 and lock up the slanted position of the head platform 52, or releases the locking pressure of the head platform 52 to enable the head platform 52 being free to adjust its inclination angle by lifting up its inner side about its outer side. It is worth mentioning that the locking head 562 is adapted to be rotated via the handle bar 563 to apply the locking pressure, so as to lock up the head platform 52 at the normal position.

The miter cutting arrangement 50 further comprises a reinforcing panel 57, having an arc-shaped through slot 571, rearwardly extended from the cutting head support bracket 40, and a screw knob 58 having a screwing head 581 extended through the through slot 571 to rotatably affix into a screw hole 572 provided at the rear end of the platform support arm 511, so that the projectile angle of the head platform 52 is capable of being adjusted by rotating the rear end of the platform support arm 511 about the mounting means 512 and locked up by tightening the screw knob 58 along the through slot 571.

Figure 6:
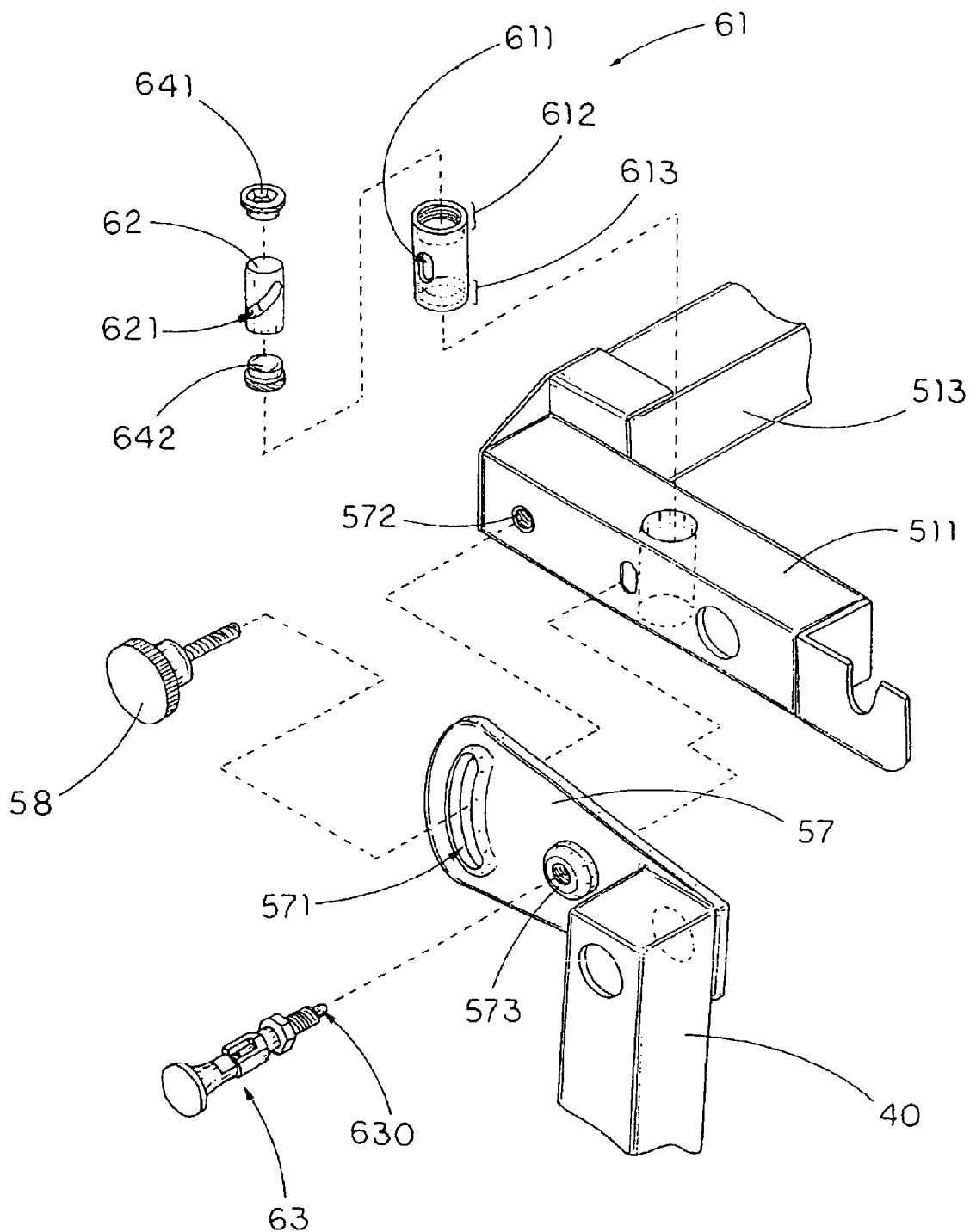
FIG. 6 is an exploded perspective view of a miter cutting arrangement of the cutting machine for adjusting a projectile angle of the cutting head according to the above preferred embodiment of the present invention.

According to the preferred embodiment, the miter cutting arrangement 50 is adapted to finely adjust the projectile angle of the cutting head 30 with respect to the cutting table 20. As shown in FIG. 6, the miter cutting arrangement 50 further comprises a reinforcing sleeve 61, having a longitudinal adjustment slot 611, securely mounted at the rear end of the platform support arm 511, a regulating ring 62, having an inclined tuning slot 621, rotatably supported in the reinforcing sleeve 61 to overlappedly align the tuning slot 621 with the adjustment slot 611 so as to form a locking hole 601, and a fine-tuning locker 63 having a locker head 630 penetrated through the reinforcing panel 57 and arranged to insert into the locking hole 601, so as to adjust the projectile angle of the head platform 52.

As shown in FIG. 6, the reinforcing sleeve 61 is embedded at the rear end of the platform support arm 511 and has an upper threaded portion 612 and a lower threaded portion 613 wherein the adjustment slot 611 is longitudinally provided between the upper and lower threaded portions 612, 613 of the reinforcing sleeve 61.

Figure 7C:
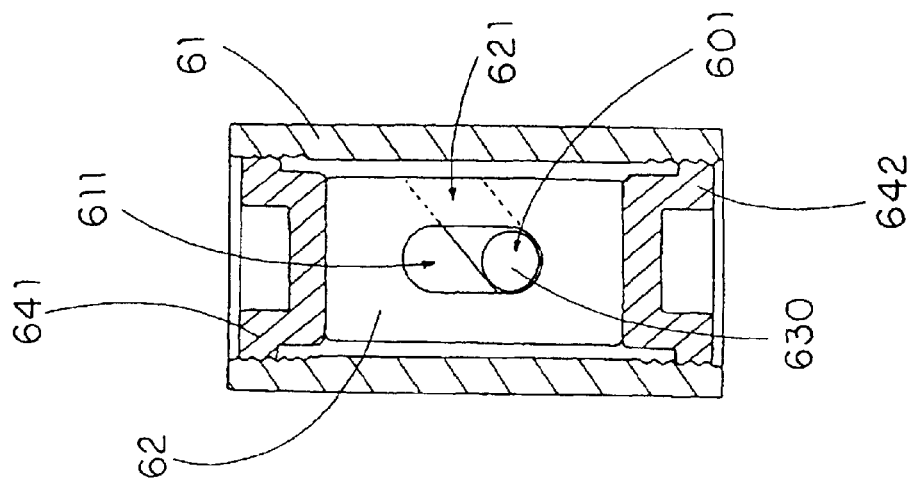
FIGS. 7A to 7C illustrates the miter cutting arrangement for fine adjusting the projectile angle of the cutting head of the cutting machine according to the above preferred embodiment of the present invention.
Figure 7B:
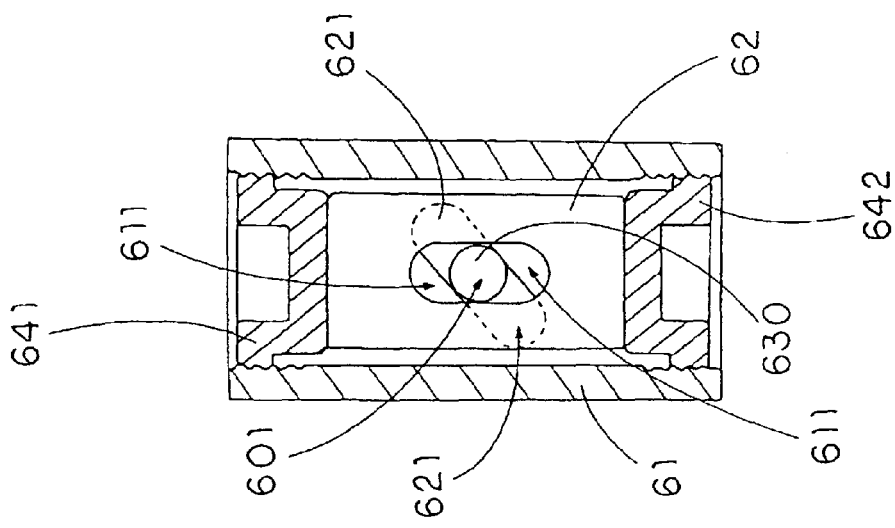
Figure 7A:
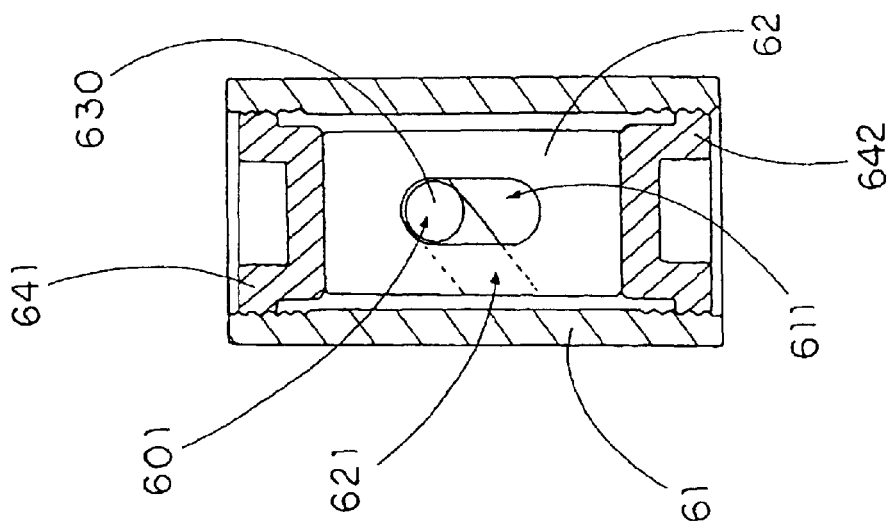

The regulating ring 62 is rotatably disposed in the reinforcing sleeve 61 between the upper and lower threaded portions 612, 613 thereof, wherein the locking hole 601 is formed when the tuning slot 621 of the regulating ring 62 is overlapped with the adjustment slot 611 of the reinforcing sleeve 61. As shown in FIGS. 7A to 7C, by selectively rotating the regulating ring 62, the locking hole 601 is formed along the adjustment slot 611, so that when the fine-tuning locker 62 is inserted into the locking hole 601, the pivotal movement of the platform support arm 511 is locked up with respect to the cutting head support bracket 40, so as to lock up the head platform 52 at the projectile angle.

In order to securely mounted the regulating ring 62 in the reinforcing sleeve 61 in position, the miter cutting arrangement 50 further comprises a lower locker 641 having an outer threaded portion rotatably screwed at the lower threaded portion 613 of the reinforcing sleeve 61 and an upper locker 642 having an outer threaded portion rotatably screwed at the upper threaded portion 612 of the reinforcing sleeve 61 in such a manner that the regulating ring 62 is securely sandwiched between the upper and lower lockers 642, 641, so as to align the tuning slot 621 of the regulating ring 62 with the adjustment slot 611 of the reinforcing sleeve 61.

Figure 8:
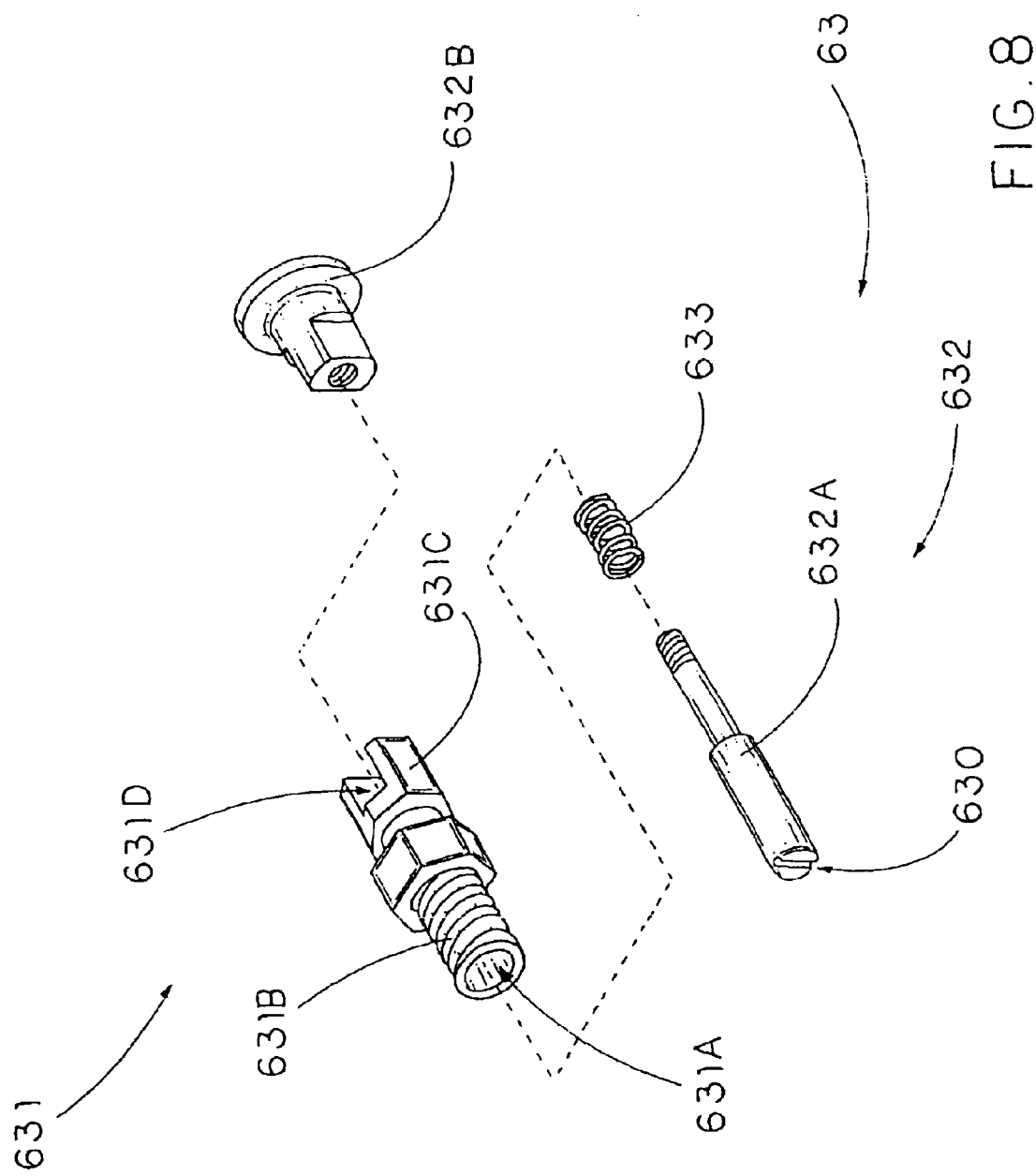
FIG. 8 is an exploded perspective view of a fine-tuning locker of the miter cutting arrangement of the cutting machine according to the above preferred embodiment of the present invention.

As shown in FIG. 8, the fine-tuning locker 63, according to the preferred embodiment, comprises a tubular locker body 631 securely affixed to the reinforcing panel 57, a locker arm 632 slidably inserted into the locker body 631 to penetrate through the platform support arm 511 at a position that the locker head 630 is adapted to be inserted into the locking hole 601, and a resilient element 633 received in the locker body 631 for applying an urging pressure against the locker arm 632 to push the locker head 630 of the locker arm 632 towards the locking hole 601.

Accordingly, the locker body 631 has a receiving cavity 631A provided therein for receiving the resilient element 633, an outer threaded tail portion 631B securely screwed into a screwing hole 573 provided on the reinforcing panel 57, and a U-shaped cross sectional head portion 631C forming a securing slot 631D, wherein the locker arm 632 has an elongated body 632A slidably inserted into the locker body 631 and an enlarged head 632B shaped in such a manner that when the locker head 630 is inserted into the locking hole 601, the enlarged head 632B is engaged with the securing slot 631D of the locker body 631, so as to ensure the locking engagement between the reinforcing panel 57 and the platform support arm 511.

The resilient element 633, according to the preferred embodiment, is a compression spring disposed in the receiving cavity 631A wherein the resilient element 633 has two ends biasing against a bottom wall of the receiving cavity 631A and the elongated body 632A of the locker arm 632 so as to substantially push the locker arm 632 towards the reinforcing sleeve 61 until the locker head 630 is inserted into the locking hole 601.

In order to set the projectile angle of the head platform 52, the user is able to slidably pull the locker arm 632 outwardly from the locker body 631 until the locker head 630 is slid to disengage with the locking hole 601. Then, the user is able to pivotally move the platform support arm 511 to obtain a desired projectile angle of the head platform 52, such as parallel to the cutting table 20. Afterward, by rotating the regulating ring 62 within the reinforcing sleeve 61 until the tuning slot 621 of the regulating ring 62 is overlapped with the adjustment slot 611 of the reinforcing sleeve 61 to form the locking hole 601, the user is able to push the locker arm 632 until the locker head 630 is inserted into the locking hole 601. Therefore, by tightening the upper and lower lockers 642, 641, the reinforcing sleeve 61 is securely locked in the reinforcing sleeve 61 in position.

Moreover, the user is able to pull out the locker head 630 from the locking hole 601, so that the platform support arm 511 is capable of pivotally moving with respect to the cutting head support bracket 40 so as to adjust the projectile angle of the cutting head 30. Once the user wants to set the cutting head 30 back to the original setting of the projectile angle, he or she can simply insert the locker head 630 back into the locking hole 601 without any re-measurement of the projectile angle.

What is claimed is:

1. A cutting machine, comprising:

a table frame;

a power source;

a cutting table slidably mounted on said table frame;

a cutting head having a cutting blade arranged to be driven to rotate by said power source;

a cutting head support bracket affixed at one side of said table frame to support said cutting head above the cutting table; and a miter cutting arrangement, which is provided between said cutting head support bracket and said cutting head, wherein said miter cutting arrangement comprises:

a platform, support frame which comprises a platform support arm, means for longitudinally mounting said platform support arm to said cutting head support bracket so as to support said platform support arm longitudinally extending above said table frame, and a platform pivot arm having an inner end affixed to said platform support arm and an outer end extended from said platform support arm;

a head platform, which supports said cutting blade in a rotatable manner, having an outer side and an inner side;

a pivot mean for pivotally connecting said outer side of said head platform with said platform pivot arm in a perpendicular manner that said cutting head is able to be rotated about said head platform to a slanted position by lifting up said inner side of said head platform from said platform support frame;

a miter supporting unit which comprises a miter support provided at said outer side of said head platform and a miter stopper provided at said outer end of said platform pivot arm to block the miter support when said head platform is rotated about said pivot means, so as to substantially support said head platform in said slanted position, wherein said miter stopper has a stopper body rotatably affixed to said platform pivot arm and a stopper head which is extended from said stopper body and protruded from said outer end of said platform pivot arm, wherein when said inner side of said head platform is lifted up to inclinedly rotate said cutting head, said head portion of said miter support is driven to bias against said miter stopper so as to block a rotational movement of said head platform and substantially support said cutting head at said slanted position, wherein said stopper body of said miter stopper is non-coaxially extended from said stopper head thereof so as to adjust an inclination angle of said head platform with respect to said cutting table by rotating said stopper head via said stopper body;

a supporting means for supporting said inner side of said head platform with said platform support arm, so that, during said normal position, said outer side and said inner side of said head platform are respectively supported by said platform pivot arm and said platform support arm; and a locker means for selectively locking said cutting head at said normal position and said slanted position.

2. A cutting machine, as recited in claim 1, wherein said miter support of said miter supporting unit has a tail portion substantially affixed to said outer side of said head platform and a head portion upwardly protruded from said head platform to bias against said stopper head of said miter stopper when said head platform is in said slanted position.

3. A cutting machine, as recited in claim 1, wherein said miter supporting unit further comprises a locking element for securely locking up said stopper body at a rear end thereof to said outer end of said platform pivot arm after a fine adjustment of said inclination angle of said head platform is set.

4. A cutting machine, as recited in claim 3, wherein said miter support of said miter supporting unit has a tail portion substantially affixed to said outer side of said head platform and a head portion upwardly protruded from said head platform to bias against said stopper head of said miter stopper when said head platform is in said slanted position.

5. A cutting machine, as recited in claim 4, wherein said miter cutting arrangement further comprises a reinforcing panel, having an arc-shaped through slot, rearwardly extended from said cutting head support bracket, and a screw knob having a screwing head extended through said through slot to rotatably affix into a screw hole provided at a rear end of said platform support arm, so as to adjust a projectile angle of said head platform with respect to said cutting table by rotating said rear end of said platform support arm by said mounting means.

6. A cutting machine, as recited in claim 5, wherein said miter cutting arrangement further comprises a reinforcing sleeve, having a longitudinal adjustment slot, securely mounted at said rear end of said platform support arm, a regulating ring, having an inclined tuning slot, rotatably supported in said reinforcing sleeve to overlappedly align said tuning slot with said adjustment slot so as to form a locking hole, and a fine-tuning locker having a locker head penetrated through said reinforcing panel and arranged to insert into said locking hole, so as to finely adjust said projectile angle of said head platform.

7. A cutting machine, as recited in claim 6, wherein said reinforcing sleeve has an upper threaded portion and a lower threaded portion wherein said adjustment slot is longitudinally provided between said upper and lower threaded portions of said reinforcing sleeve, wherein said miter cuffing arrangement further comprises a lower locker having an outer threaded portion rotatably screwed at said lower threaded portion of said reinforcing sleeve and an upper locker having an outer threaded portion rotatably screwed at said upper threaded portion of said reinforcing sleeve in such a manner that said regulating ring is securely sandwiched between said upper and lower lockers, so as to align said tuning slot of said regulating ring with said adjustment slot of said reinforcing sleeve.

8. A cutting machine, as recited in claim 1, wherein said miter cutting arrangement further comprises a reinforcing panel, having an arc-shaped through slot, rearwardly extended from said cutting head support bracket, and a screw knob having a screwing head extended through said through slot to rotatably affix into a screw hole provided at a rear end of said platform support arm, so as to adjust a projectile angle of said head platform with respect to said cutting table by rotating said rear end of said platform support arm by said mounting means.

9. A cutting machine, as recited in claim 8, wherein said miter cutting arrangement further comprises a reinforcing sleeve, having a longitudinal adjustment slot, securely mounted at said rear end of said platform support arm, a regulating ring, having an inclined tuning slot, rotatably supported in said reinforcing sleeve to overlappedly align said tuning slot with said adjustment slot so as to form a locking hole, and a fine-tuning locker having a locker head penetrated through said reinforcing panel and arranged to insert into said locking hole, so as to finely adjust said projectile angle of said head platform.

10. A cutting machine, as recited in claim 6, wherein said reinforcing sleeve has an upper threaded portion and a lower threaded portion wherein said adjustment slot is longitudinally provided between said upper and lower threaded portions of said reinforcing sleeve, wherein said miter cutting arrangement further comprises a lower locker having an outer threaded portion rotatably screwed at said lower threaded portion of said reinforcing sleeve and an upper locker having an outer threaded portion rotatably screwed at said upper threaded portion of said reinforcing sleeve in such a manner that said regulating ring is securely sandwiched between said upper and lower lockers, so as to align said tuning slot of said regulating ring with said adjustment slot of said reinforcing sleeve.

11. A cutting machine, as recited in claim 9, wherein said fine-tuning locker comprises a tubular locker body securely affixed to the reinforcing panel, a locker arm slidably inserted into said locker body to penetrate through said platform support arm at a position that said locker head is adapted to be inserted into said locking hole, and a resilient element received in said locker body for applying an urging pressure against said locker arm to push said locker head of said locker arm towards said locking hole.

12. A cutting machine, as recited in claim 9, wherein said fine-tuning locker comprises a tubular locker body securely affixed to the reinforcing panel, a locker arm slidably inserted into said locker body to penetrate through said platform support arm at a position that said locker head is adapted to be inserted into said locking hole, and a resilient element received in said locker body for applying an urging pressure against said locker arm to push said locker head of said locker arm towards said locking hole.

13. A cutting machine, comprising:

a table frame;

a power source;

a cutting table slidably mounted on said table frame;

a cutting head having a cutting blade arranged to be driven to rotate by said power source;

a cutting head support bracket affixed at one side of said table frame to support said cutting head above the cutting table; and a miter cutting arrangement, which is provided between said cutting head support bracket and said cutting head, wherein said miter cutting arrangement comprises:

a platform support frame which comprises a platform support arm, means for longitudinally mounting said platform support arm to said cutting head support bracket so as to support said platform support arm longitudinally extending above said table frame, and a platform pivot arm having an inner end affixed to said platform support arm and an outer end extended from said platform support arm;

a head platform which supports said cuffing blade in a rotatable manner;

a reinforcing panel, having an arc-shaped through slot, rearwardly extended from said cutting head support bracket;

a screw knob having a screwing head extended through said through slot of said reinforcing panel to rotatably affix into a screw hole provided at a rear end of said platform support arm, so as to adjust a projectile angle of said head platform with respect to said cutting table by rotating said rear end of said platform support arm by said mounting means;

a reinforcing sleeve, having a longitudinal adjustment slot, securely mounted at said rear end of said platform support arm;

a regulating ring, having an inclined tuning slot, rotatably supported in said reinforcing sleeve to overlappedly align said tuning slot with said adjustment slot so as to form a locking hole; and a fine-tuning locker having a locker head penetrated through said reinforcing panel and arranged to insert into said locking hole, so as to finely adjust said projectile angle of said head platform.

14. A cutting machine, as recited in claim 13, wherein said fine-tuning locker comprises a tubular locker body securely affixed to the reinforcing panel, a locker arm slidably inserted into said locker body to penetrate through said platform support arm at a position that said locker head is adapted to be inserted into said locking hole, and a resilient element received in said locker body for applying an urging pressure against said locker arm to push said locker head of said locker arm towards said locking hole.

15. A cutting machine, as recited in claim 14, wherein said locker body has a receiving cavity provided therein for receiving said resilient element, an outer threaded tail portion securely screwed into a screwing hole provided on said reinforcing panel, and a U-shaped cross sectional head portion forming a securing slot, wherein said locker arm has an elongated body slidably inserted into said locker body and an enlarged head shaped in such a manner that when said locker head is inserted into said locking hole, said enlarged head is engaged with said securing slot of said locker body, so as to ensure a locking engagement between said reinforcing panel and said platform support arm.

16. A cutting machine, as recited in claim 13, wherein said reinforcing sleeve has an upper threaded portion and a lower threaded portion wherein said adjustment slot is longitudinally provided between said upper and lower threaded portions of said reinforcing sleeve, wherein said miter cutting arrangement further comprises a lower locker having an outer threaded portion rotatably screwed at said lower threaded portion of said reinforcing sleeve and an upper locker having an outer threaded portion rotatably screwed at said upper threaded portion of said reinforcing sleeve in such a manner that said regulating ring is securely sandwiched between said upper and lower lockers, so as to align said tuning slot of said regulating ring with said adjustment slot of said reinforcing sleeve.

17. A cutting machine, as recited in claim 16, wherein said fine-tuning locker comprises a tubular locker body securely affixed to the reinforcing panel, a locker arm slidably inserted into said locker body to penetrate through said platform support arm at a position that said locker head is adapted to be inserted into said locking hole, and a resilient element received in said locker body for applying an urging pressure against said locker arm to push said locker head of said locker arm towards said locking hole.

18. A cutting machine, as recited in claim 17, wherein said locker body has a receiving cavity provided therein for receiving said resilient element, an outer threaded tail portion securely screwed into a screwing hole provided on said reinforcing panel, and a U-shaped cross sectional head portion forming a securing slot, wherein said locker arm has an elongated body slidably inserted into said locker body and an enlarged head shaped in such a manner that when said locker head is inserted into said locking hole, said enlarged head is engaged with said securing slot of said locker body, so as to ensure a locking engagement between said reinforcing panel and said platform support arm.

* * * * *